United States Patent [19]
Peppiatt et al.

[11] Patent Number: 4,550,439
[45] Date of Patent: Oct. 29, 1985

[54] PLASTIC BAG WITH CARRYING HANDLE

[75] Inventors: Harry R. Peppiatt, Doylestown; John S. Thomas, Langhorne, both of Pa.

[73] Assignee: Paramount Packaging Corporation, Chalfont, Pa.

[21] Appl. No.: 496,359

[22] Filed: May 20, 1983

[51] Int. Cl.⁴ ............................................. B65D 30/00
[52] U.S. Cl. ......................................... 383/8; 383/21; 383/28; 383/120
[58] Field of Search ...................... 383/6, 7, 8, 10, 14, 383/15, 17, 21, 25, 28, 29, 30, 67, 9, 120; 493/226, 926; 53/226

[56] References Cited
U.S. PATENT DOCUMENTS

| 1,733,219 | 10/1929 | Duvall | 229/54 |
| 3,066,845 | 12/1962 | Mattaway | 383/9 |
| 3,370,630 | 2/1968 | Haugh et al. | 229/54 |
| 4,252,269 | 2/1981 | Peppiatt | 229/54 |

FOREIGN PATENT DOCUMENTS 1022595  3/1966  United Kingdom ................. 383/28

Primary Examiner—Steven M. Pollard
Attorney, Agent, or Firm—Seidel, Gonda, Goldhammer & Abbott

[57] ABSTRACT

A plastic bag has a front panel joined along its side edges to a rear panel with a gusset at one end of the panels. A handle is disposed within the gusset and connected to the panels by a triangular weld.

10 Claims, 6 Drawing Figures

U.S. Patent    Oct. 29, 1985    Sheet 1 of 2    4,550,439
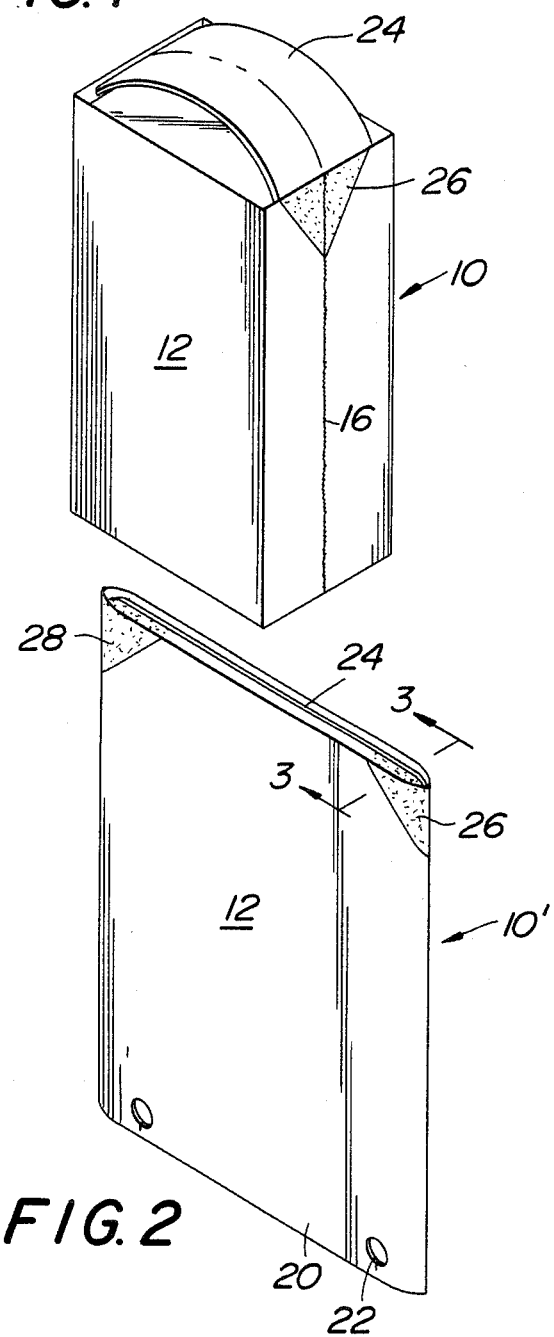
FIG. 1
FIG. 2
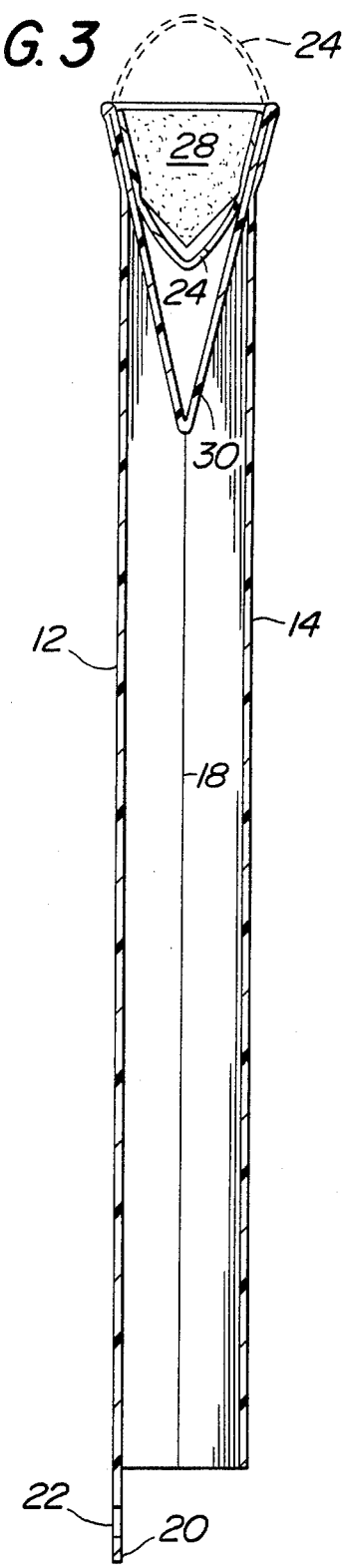
FIG. 3

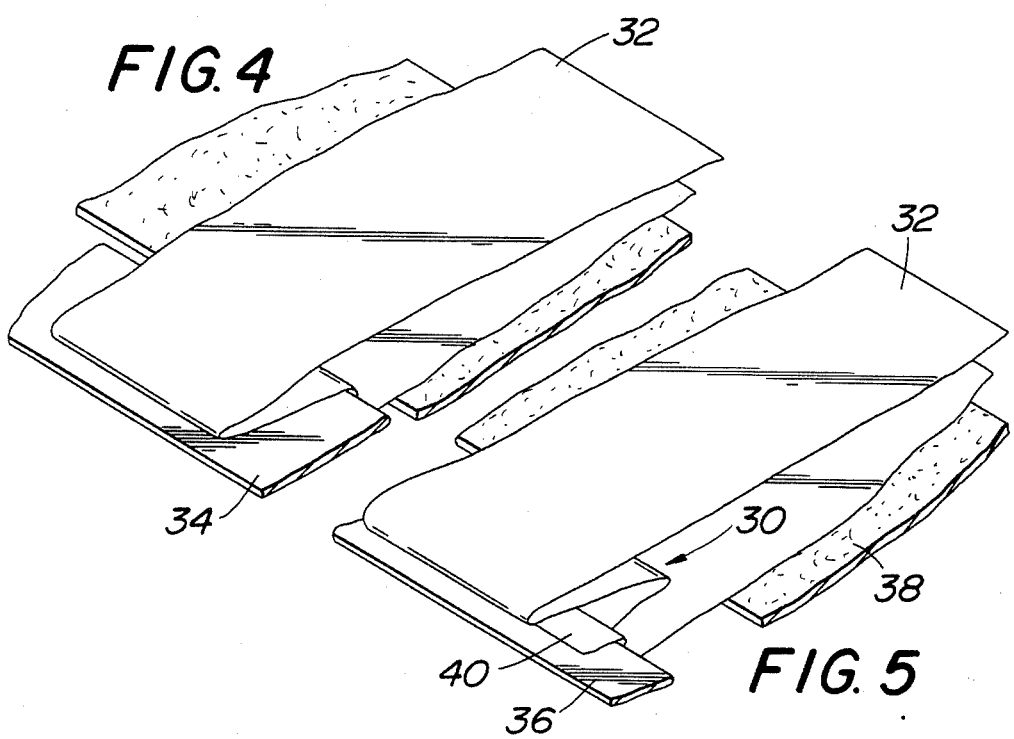
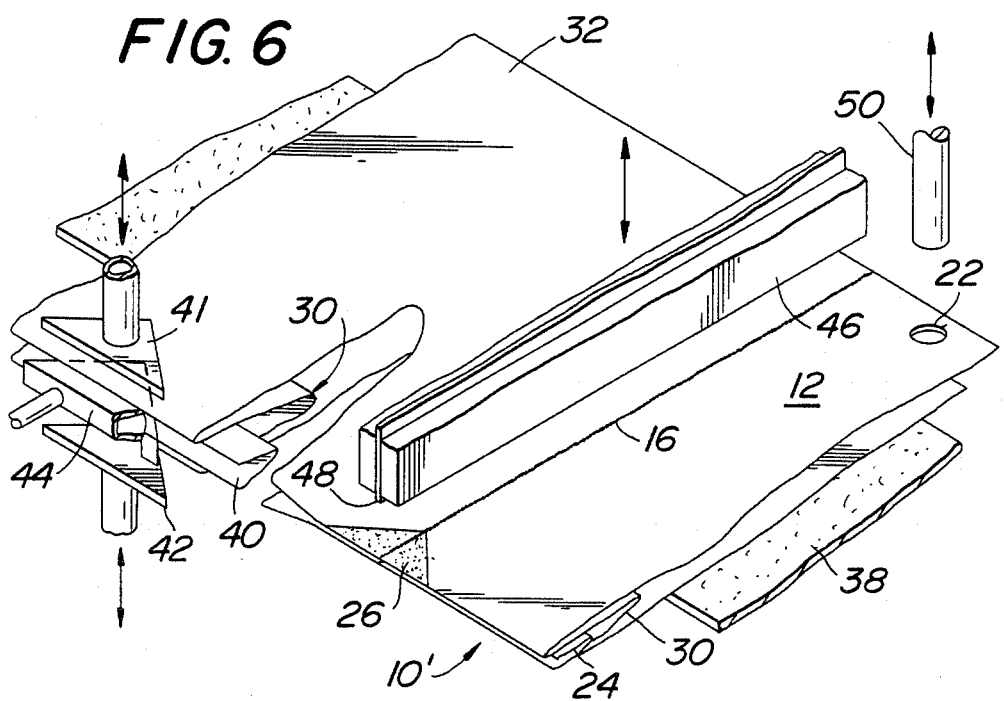

PLASTIC BAG WITH CARRYING HANDLE

BACKGROUND

Plastic bags of the general type involved herein are known to those skilled in the art. See U.S. Pat. No. 4,252,269. That patent discloses a plastic bag having a carrying handle within a gusset at one end of the bag. Due to the manner in which the handle is connected to the panels of the bag in said patent, there is a limit to the amount of weight that may be supported by the bag. The present invention is directed to solution of the problem of increasing the amount of weight that may be supported within the bag.

SUMMARY OF THE INVENTION

The present invention is directed to a plastic bag having a carrying handle at one end thereof. The bag has a front panel joined along side edges to a rear panel. There is an opening at one end of the panels and a gusset joining the opposite ends of said panels. A handle is provided in the gusset. The handle has two layers joined along a fold line. The free edges of the handle are adjacent the outer periphery of the gusset. Each end of said handle is welded to each of said panels by a triangular weld.

It is an object of the present invention to provide a plastic bag with a carrying handle arranged in a manner whereby a stress pattern is directed downwardly along the panels whereby an increased load may be packed in the bag.

Other objects and advantages will appear hereinafter.

For the purpose of illustrating the invention, there is shown in the drawings a form which is presently preferred; it being understood, however, that this invention is not limited to the precise arrangements and instrumentalities shown.

FIG. 1 is a perspective view of a package.

FIG. 2 is a perspective view of a bag in accordance with the present invention.

FIG. 3 is a sectional view taken along the line 3—3 in FIG. 2 but on an enlarged scale.

FIGS. 4–6 are partial perspective views of the sequential steps in forming the bag shown in FIG. 2.

DETAILED DESCRIPTION

Referring to the drawing in detail, wherein like numerals indicate like elements, there is shown in FIG. 1 a package designated generally as 10 and made from a bag 10'. The bag 10' includes a front panel 12 and a rear panel 14 which are juxtaposed and joined together along their side edges by welds 16 and 18.

One of the panels such as front panel 12 has an extension 20 provided with holes 22 at an open end of the bag. See FIG. 3. At the other end of the bag, there is provided a gusset 30 integral in one piece with panels 12, 14. Within the gusset 30, there is provided a handle 24 folded on itself with the fold line being remote from the outside extremities of the gusset 30. The width of handle 24 as folded is approximately one half the width of gusset 30. One end of the handle 24 is joined to the panel 12 and 14 by a V-shaped or triangular weld 26.

The other end of the handle 24 is connected to the panels 12 and 14 by similar weld 28. As a result of the shape of the welds 26, 28 lines of stress go down the panels 12 and 14 whereby a larger weight may be carried within the package 10. The sides of the welds 26, 28 converge to an apex with the included angle being approximately 90°. Thus, the bag 10' is stronger than comparable prior art bags.

The bag 10' is made from any one of a wide variety of polymeric plastic materials such as polyethylene, polypropylene, etc. The handle 24 is preferably made from a polymeric plastic having greater strength than polyethylene. Handle 24 may be transparent so that printed matter on the top of the package 10 may be read notwithstanding the fact the handle overlies the printing.

The preferred manner of producing the bag 10' is illustrated in FIGS. 4–6. As shown in FIG. 4, a web 32 is folded on itself and shaped along one side by shaper 34 to form gusset 30. The upper layer of the web will correspond to front panel 12 on the bag 10'. Thereafter, as shown in FIG. 5, a web 40 of material for the handle 34 is folded on itself and shaped by shaper 36 within the gusset 30. The web may be supported from below by a platen 38.

After the handle web 40 has been inserted into gusset 30, the gusset 30 and handle strip 40 are opened up so that an air cooled anvil 44 extends therebetween. Web 32 is intermittently moved. At a point in time when the web 32 is stationery, welding heads 41, 42 move toward the anvil and provide V-shaped or triangular welds 26, 28. At the next station, a cutting head 46 having a cutting blade 48 moves downwardly at a time when the web 32 is stationery to thereby provide the side weld 16 and to separate bag 10' from the remainder of the strip. It will be noted that the side edge weld 16 intersects the apex of the weld 26. At the same time that the weld 16 is being made, punch 52 punches the hole 22 in the extending tab portion of the front panel 12.

Thus, it will be seen that the bag 10' can be made in an efficient manner while at the same time is a stronger bag capable of handling a larger load. The holes 22 facilitate mounting the bags 10' on a wicket. When contents are introduced into the open end of the bag 10', the bag is stripped off the wicket due to a slit which intersects the holes 22. Thereafter, excess material from the panels 12 and 14 is removed by a cutting and welding step. This step closes the package 10.

The present invention may be embodied in other specific forms without departing from the spirit or essential attributes thereof and, accordingly, reference should be made to the appended claims, rather than to the foregoing specification, as indicating the scope of the invention.

I claim:

1. A polymeric plastic bag having a front panel joined along side edges to a rear panel, an opening at one end of said panels and a gusset joining the opposite ends of said panels, a handle in said gusset, said handle having two layers joined along a fold line, the free edges of the handle being adjacent the outer extremity of the gusset, each end of said handle being welded to each of said panels by a shaped weld having an apex corresponding generally to the location of the fold line on said handle.

2. A bag in accordance with claim 1 wherein each of said welds is a triangle with the included angle at the apex being approximately 90°.

3. A bag in accordance with claim 2 wherein the folded width of the handle is approximately one half the depth of the gusset.

4. A bag in accordance with claim 1 wherein said side edges of said panels are welded together by a weld line which intersects the apex on each of said shaped welds.

5. A polymeric plastic bag having a front panel joined along side edges to a rear panel, an opening at one end of said panels, a gusset integral in one piece with and joining the opposite ends of said panels, a handle in said gusset, said handle having two layers joined along a fold line, the free edges of the handle being adjacent the outer extremity of the gusset, each end of said handle being welded to each of said panels and said gusset by a triangular shaped weld having an apex corresponding generally to the location of the fold line on said handle, said welds having the included angle at the apex of approximately 90°, the folded width of the handle being approximately one half the depth of the gusset, and said side edges of said panels being welded together by a weld line which intersects the apex on each of said triangular shaped welds.

6. A bag in accordance with claim 5 wherein one of said panels is longer than the other and has a pair of holes therein adjacent said one end.

7. A bag in accordance with claim 1 wherein said weld is a triangle with its base at said opposite ends of the panels.

8. A bag in accordance with claim 7 wherein said handle has a width generally equal to the length of the base of said triangle.

9. A polymeric plastic bag having a front panel joined along side edges to a rear panel, an opening at one end of said panels and a gusset joining the opposite ends of said panels, a handle in said gusset, said handle having two layers joined along a fold line and free edge portions between its ends, each end of said handle being welded to each of said panels by a shaped weld having an apex corresponding generally to the location of the fold line on said handle.

10. A polymeric plastic bag having a front panel joined along side edges to a rear panel, an opening at one end of said panels, a gusset integral in one piece with and joining the opposite ends of said panels, a handle in said gusset, said handle having two layers joined along a fold line and free edge portions between its ends, each end of said handle being welded to each of said panels and said gusset by a triangular shaped weld having an apex corresponding generally to the location of the fold line on said handle, said welds having the included angle at the apex of approximately 90°, the folded width of the handle being approximately one half the depth of the gusset, and said side edges of said panels being welded together by a weld line which intersects the apex on each of said triangular shaped welds.

* * * * *